(12) United States Patent
Parrish et al.

(10) Patent No.: US 12,712,871 B2
(45) Date of Patent: Aug. 18, 2026

(54) SYSTEMS, METHODS, AND APPARATUSES FOR TRANSMISSION OF VERIFICATION CERTIFICATES IN AN ELECTRONIC NETWORK

(71) Applicant: BANK OF AMERICA CORPORATION, Charlotte, NC (US)

(72) Inventors: Jason David Parrish, Saint Johns, FL (US); Brady Prentice Merkel, Jacksonville Beach, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 544 days.

(21) Appl. No.: 17/950,286

(22) Filed: Sep. 22, 2022

(65) Prior Publication Data

US 2024/0106817 A1 Mar. 28, 2024

(51) Int. Cl.
*H04L 9/40* (2022.01)

(52) U.S. Cl.
CPC ........ *H04L 63/0823* (2013.01); *H04L 63/166* (2013.01)

(58) Field of Classification Search
CPC .......................... H04L 63/0823; H04L 63/166
See application file for complete search history.

(56) References Cited

U.S. PATENT DOCUMENTS 8,214,884 B2 7/2012 Xia
8,225,096 B2 7/2012 Miyamoto
8,479,001 B2 7/2013 Yoneda
8,689,290 B2 4/2014 Buer
8,713,644 B2 4/2014 Krishna
9,774,581 B2 9/2017 Leicher
9,819,666 B2 11/2017 Mowers
9,992,189 B2 6/2018 Hayes
10,586,229 B2 3/2020 Hurry
10,819,697 B1 10/2020 Mcpherson
(Continued)

FOREIGN PATENT DOCUMENTS

CN 111241518 A * 6/2020 ............ G06F 21/56
CN 115988012 A * 4/2023
(Continued)

OTHER PUBLICATIONS

Giacomo Leopizzi • Andrejs Romanovsl; Development of a new server-to-server communication security approach; 2024 IEEE 11th Workshop on Advances in Information, Electronic and Electrical Engineering (AIEEE) (2024, pp. 1-6); (Year: 2024).*
(Continued)

*Primary Examiner* — Luu T Pham
*Assistant Examiner* — Chao Wang
(74) *Attorney, Agent, or Firm* — Moore & Van Allen PLLC; Nicholas C. Russell

(57) ABSTRACT

The present invention provides for implementing an internal entity intermediate certificate authority via a mutual transport layer security conversation to allow an entity-specific certificate authority to generate its own certificate which is transmitted to a second point in the internal transmission for sending of the external certificate authority generated certificate to the external entity for mutual authentication. Further, in this way, the first point of internal transmission does not have to store the certificate in its own hardware security module.

11 Claims, 7 Drawing Sheets

(56) References Cited

U.S. PATENT DOCUMENTS

| | | | | |
|---|---|---|---|---|
| 10,848,318 | B2 | 11/2020 | Uhr | |
| 11,095,635 | B2 | 8/2021 | Pendarakis | |
| 2008/0060055 | A1 | 3/2008 | Lau | |
| 2010/0268932 | A1 | 10/2010 | Bhattacharjee | |
| 2012/0030469 | A1 | 2/2012 | Hsueh | |
| 2014/0165147 | A1 | 6/2014 | Hershberg | |
| 2014/0359713 | A1 * | 12/2014 | Ren | H04L 67/53 726/4 |
| 2016/0189147 | A1 | 6/2016 | Vanczak | |
| 2017/0171189 | A1 | 6/2017 | Byszio | |
| 2019/0005470 | A1 | 1/2019 | Uhr | |
| 2021/0058259 | A1 | 2/2021 | Le Saint | |
| 2021/0385225 | A1 | 12/2021 | Guionneau | |
| 2022/0029988 | A1 * | 1/2022 | Levin | H04L 63/0869 |
| 2022/0116230 | A1 | 4/2022 | Dietrich | |

FOREIGN PATENT DOCUMENTS

| | | | |
|---|---|---|---|
| JP | 2004320751 | A * | 11/2004 |
| JP | 2004350267 | A * | 12/2004 |

OTHER PUBLICATIONS

Sandro Rodriguez Garzon • Dennis Natusch • Artur Philipp; DID Link: Authentication in TLS with Decentralized Identifiers and Verifiable Credentials; 2024 21st Annual International Conference on Privacy, Security and Trust (PST) (2024, pp. 1-11); (Year: 2024).*

Konrad Jeziorski • Danny McFadden • Ruth Lennon; Verification of Certificate Authorities (CAs) and integration with cloud providers for enhanced security; 2023 Cyber Research Conference—Ireland (Cyber-RCI) (2023, pp. 1-8); (Year: 2023).*

* cited by examiner

SYSTEMS, METHODS, AND APPARATUSES FOR TRANSMISSION OF VERIFICATION CERTIFICATES IN AN ELECTRONIC NETWORK

BACKGROUND

Entities that securely communicate data with other entities or vendors may currently have difficulty verifying whether a certificate generated in one component and transmitted internally to another component is securely transmitted. A need exists for an improved system for verifying certificates in an electronic network.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for securely transmitting verification certificates in an electronic network. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: receive a request to establish a secure connection between an internal entity server and an external third party entity server; initiate an intermediate certificate authority module; generate, via the intermediate certificate authority module, a unique verification certificate; transmit the unique verification certificate to the internal entity server; and simultaneously transmit the unique verification certificate to the external third party entity server.

In some embodiments, the internal entity server does not store the unique verification certificate in a hardware security module.

In some embodiments, the system is further configured to transmit the unique verification certificate to a second internal point other than the internal entity server.

In some embodiments, the second internal point comprises an application proxy.

In some embodiments, the application proxy communicates directly with the internal entity server.

In some embodiments, the unique verification certificate is transmitted over a mutual transport layer security protocol.

In some embodiments, the intermediate certificate authority module exists within a network boundary of a same entity as the internal entity server.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
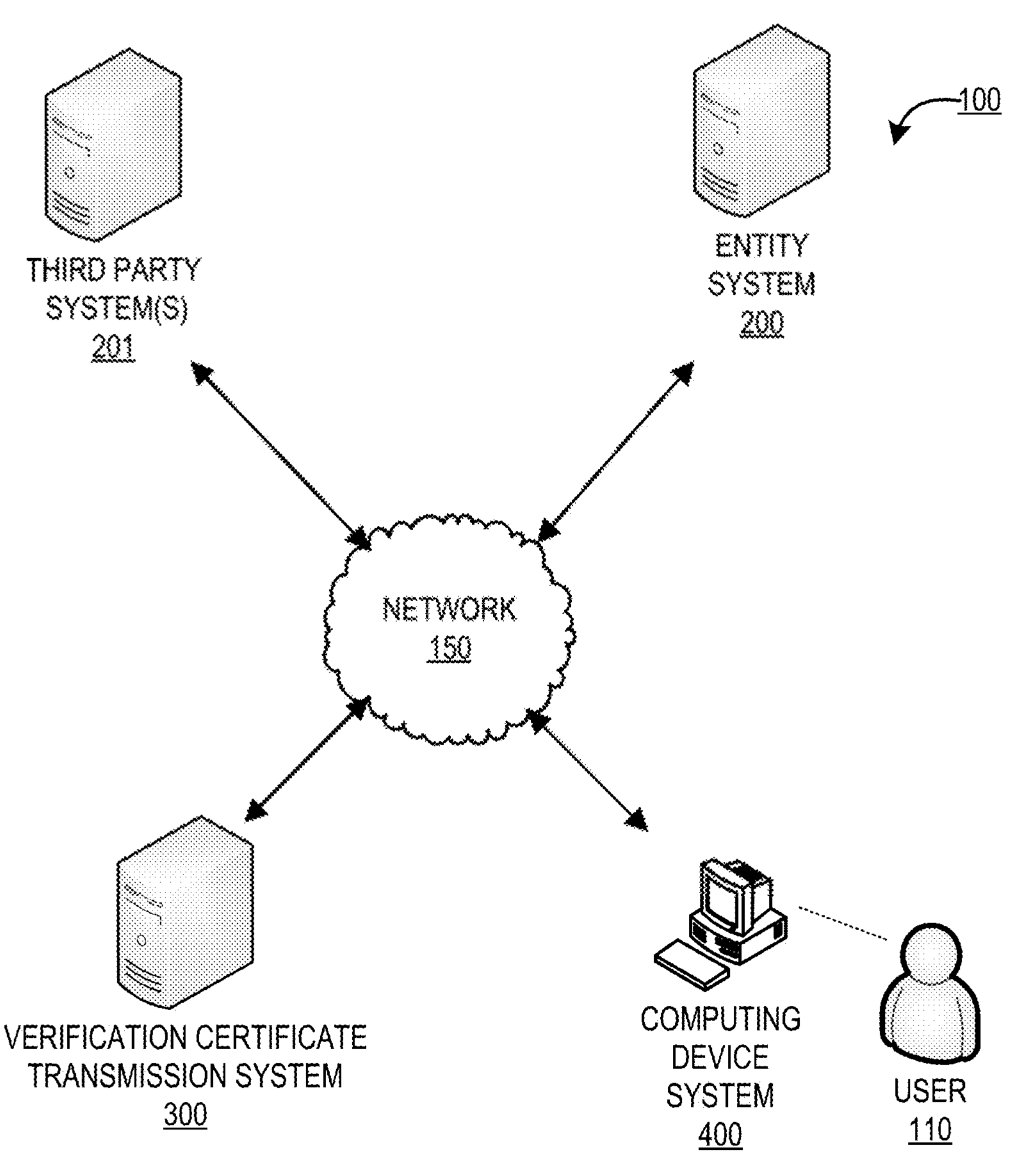
Figure 2:
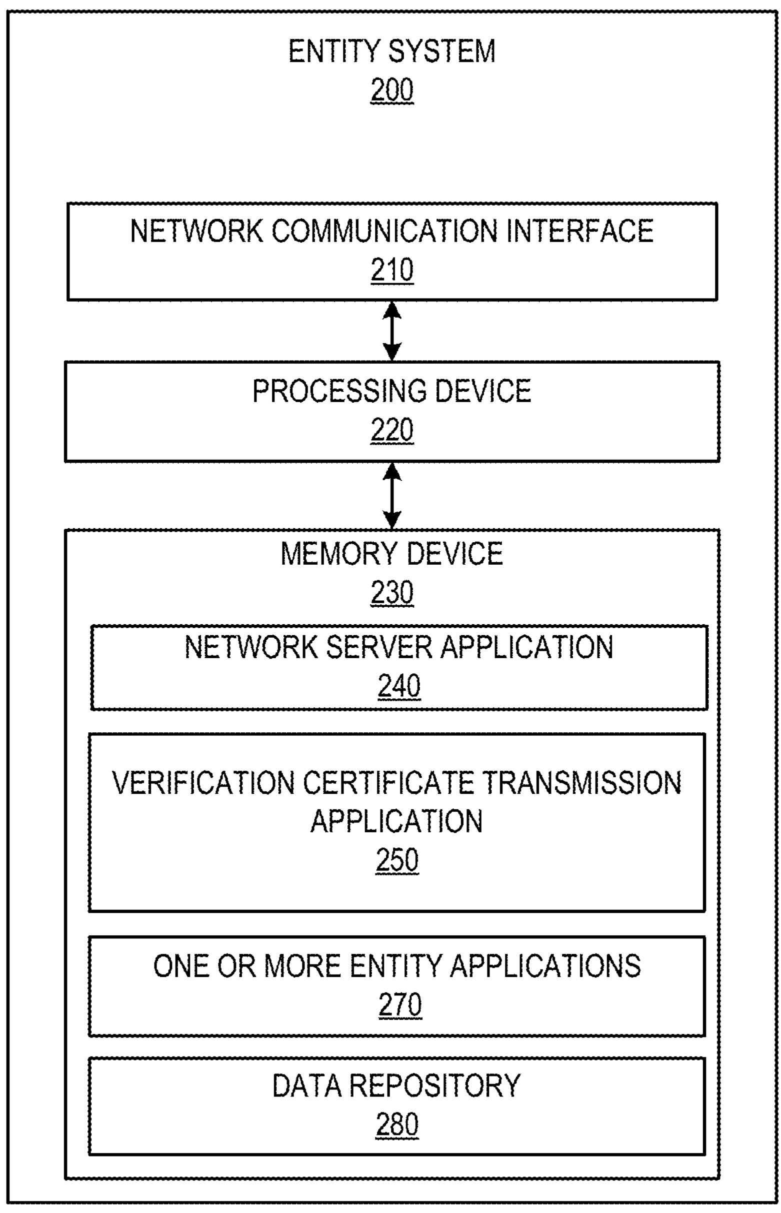
Figure 3:
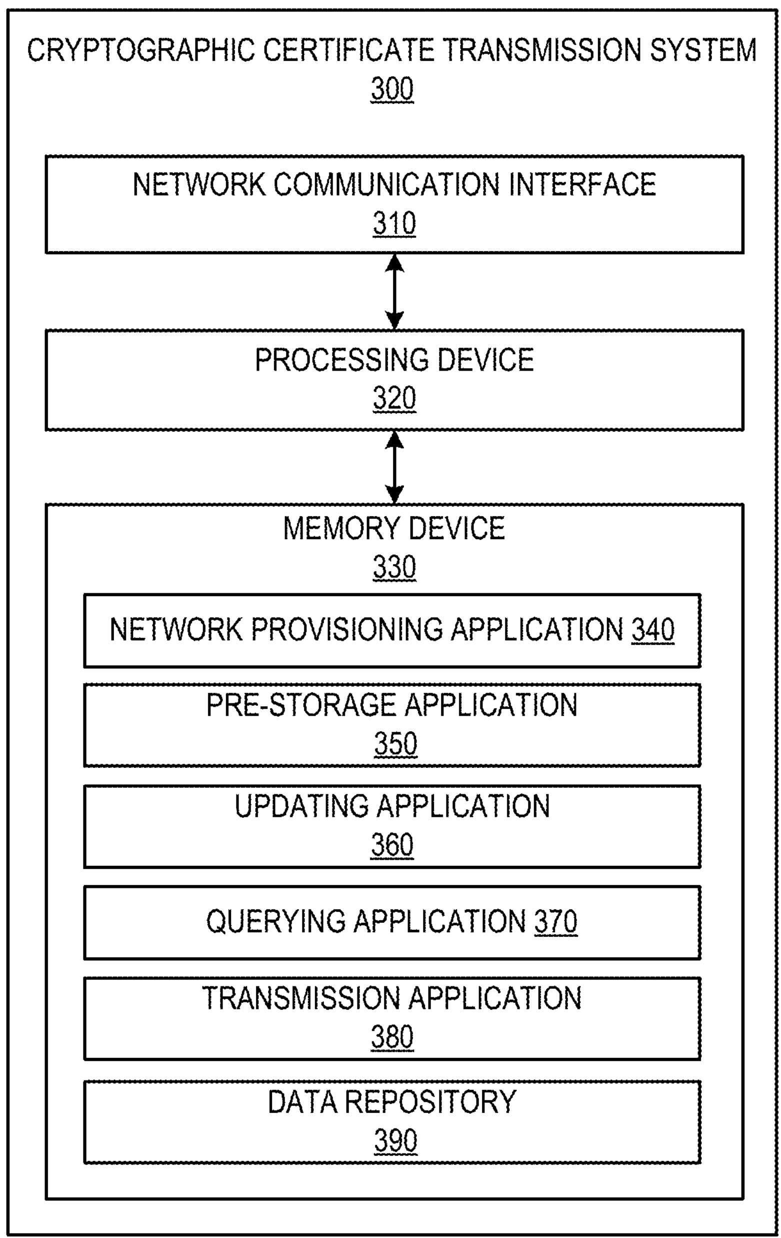
Figure 4:
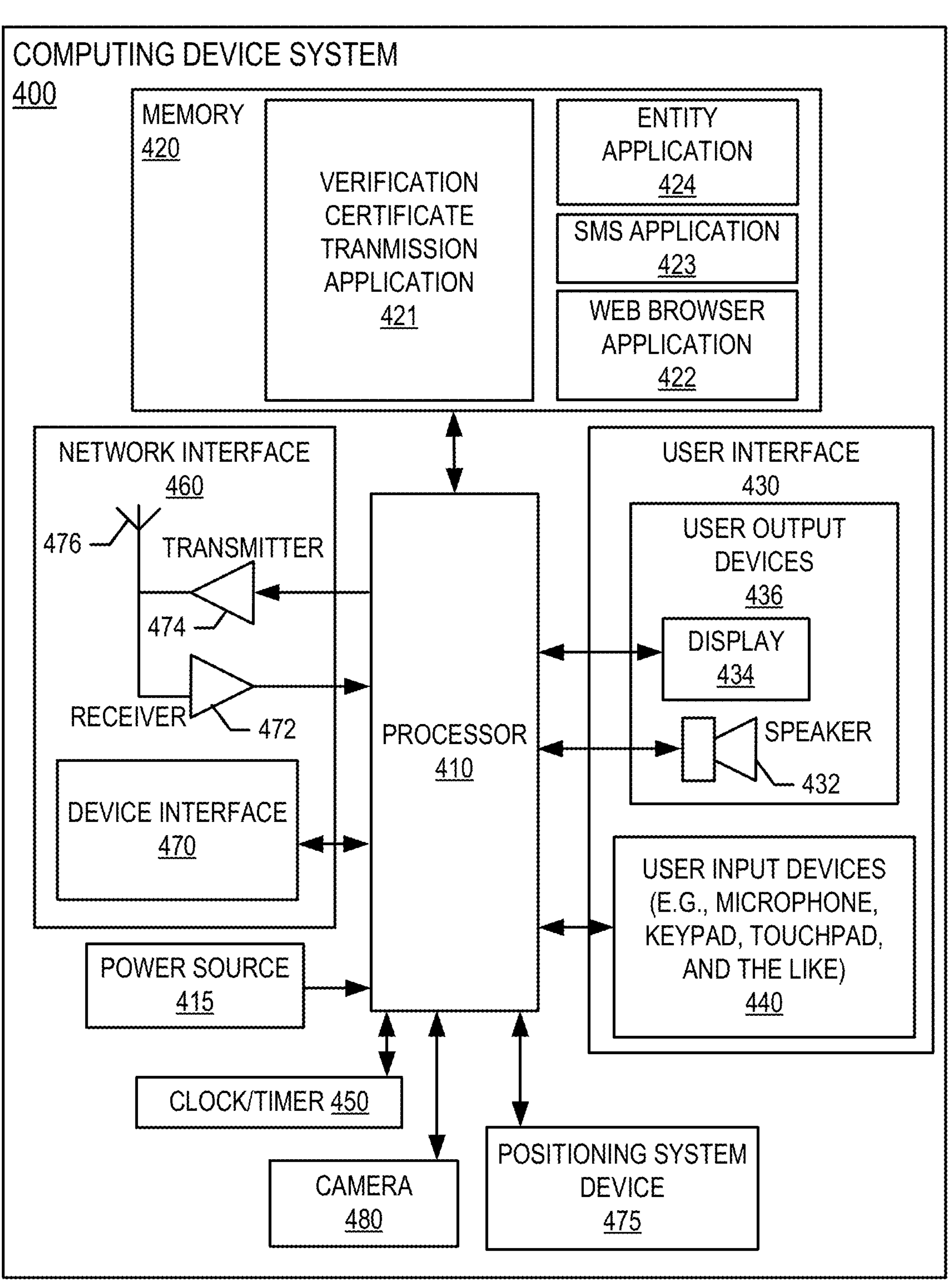
Figure 5A:
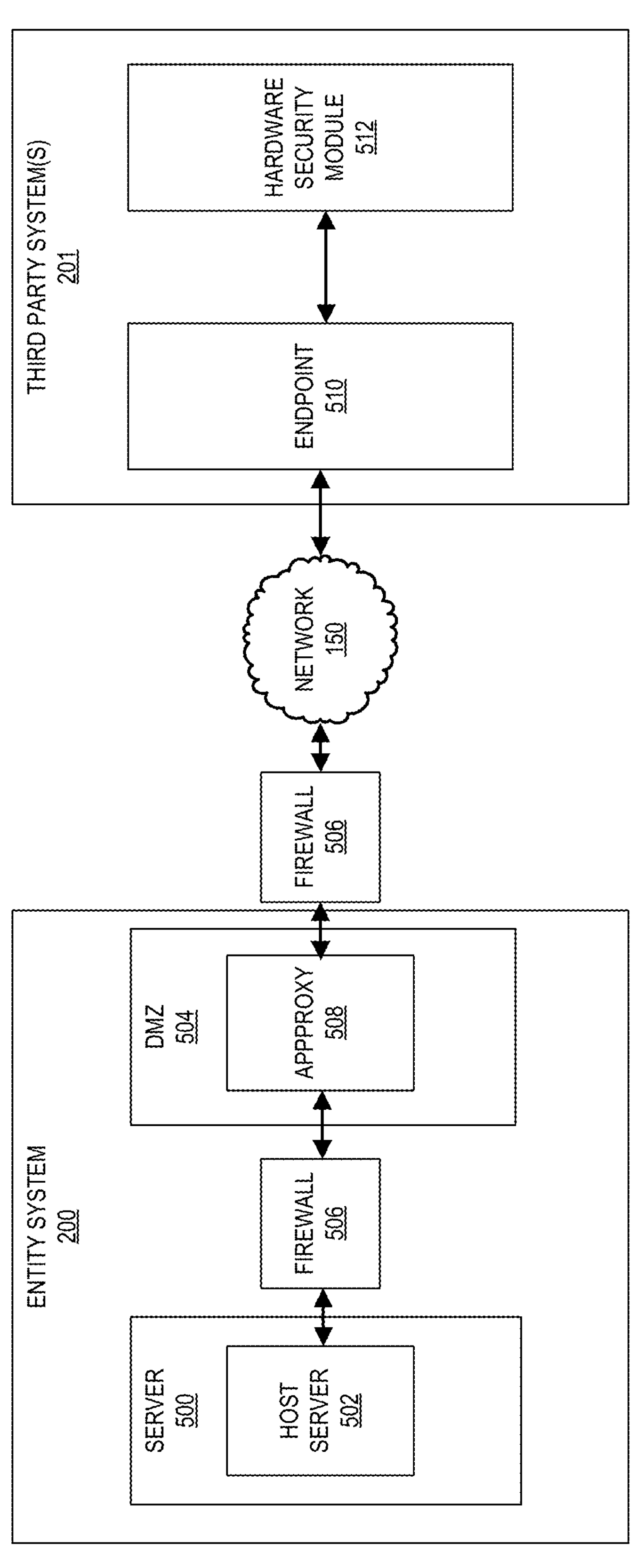
Figure 5B:
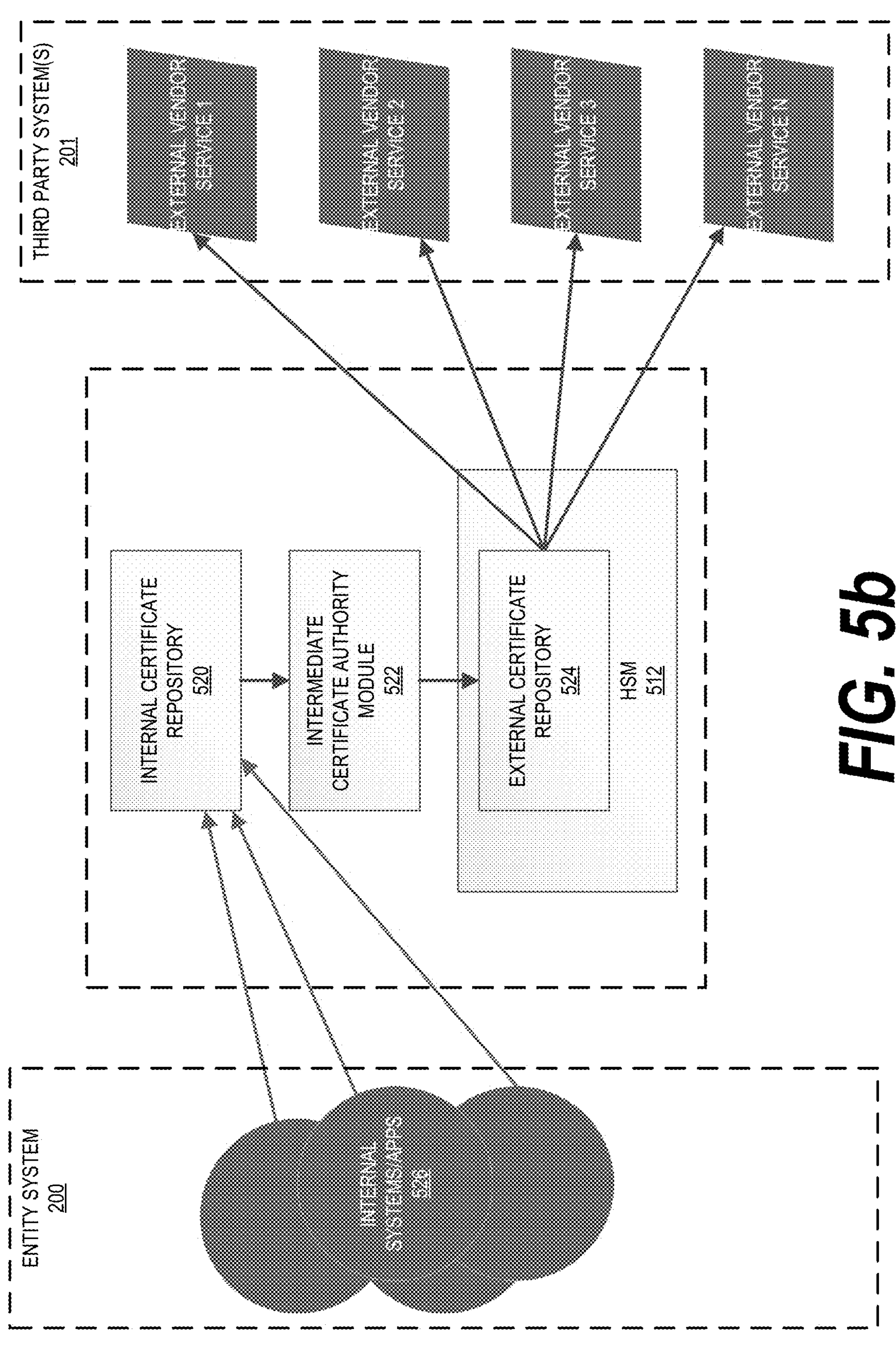
Figure 6:
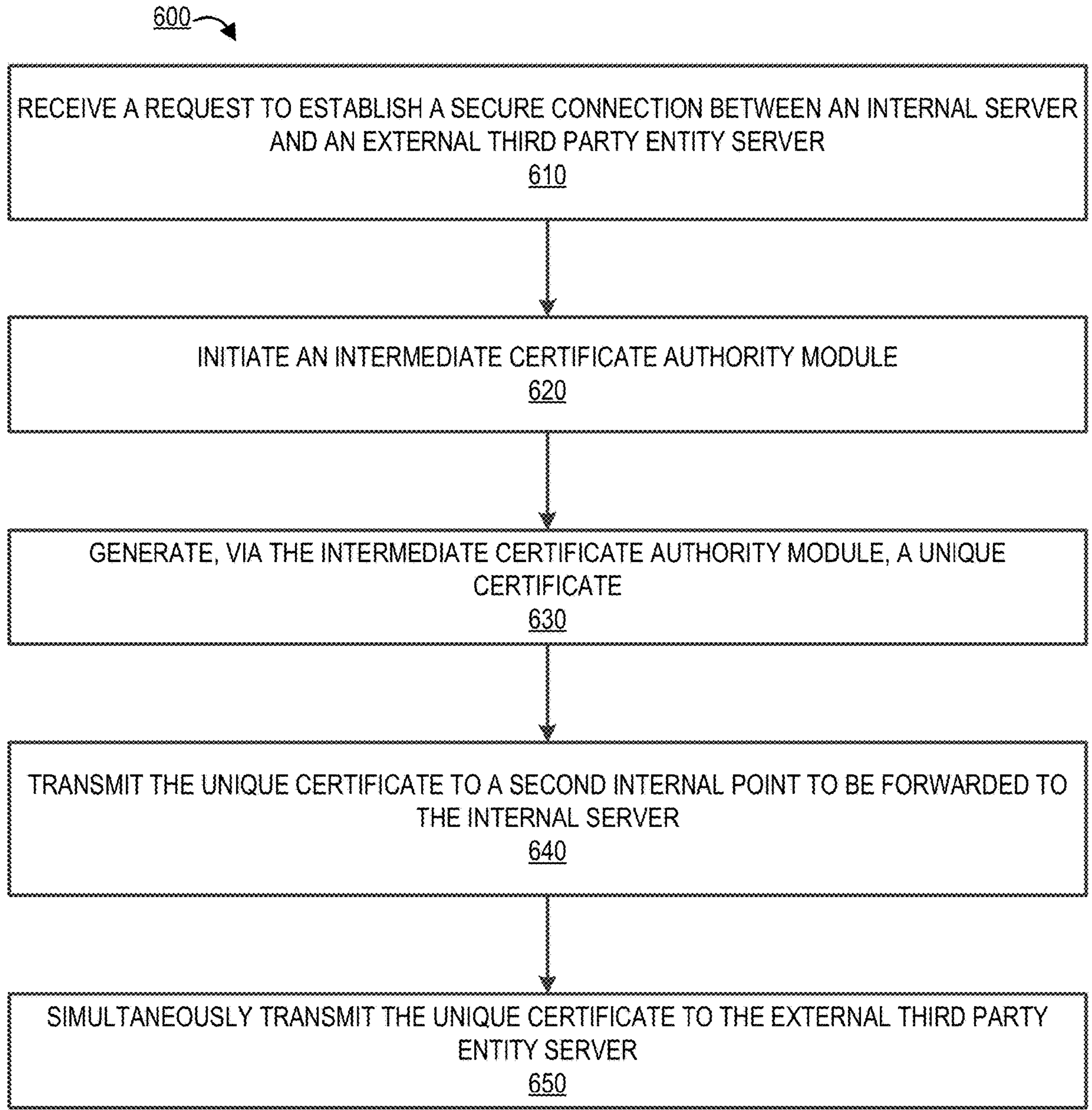

Having thus described embodiments of the invention in general terms, reference will now be made the accompanying drawings, wherein:

FIG. 1 provides a block diagram illustrating a system environment for securely transmitting verification certificates in an electronic network, in accordance with an embodiment of the invention;

FIG. 2 provides a block diagram illustrating the entity system 200 of FIG. 1, in accordance with an embodiment of the invention;

FIG. 3 provides a block diagram illustrating a verification certificate transmission system 300 of FIG. 1, in accordance with an embodiment of the invention;

FIG. 4 provides a block diagram illustrating the computing device system 400 of FIG. 1, in accordance with an embodiment of the invention;

FIG. 5*a* provides a diagram for electronically transmitting certificates, in accordance with an embodiment of the invention;

FIG. 5*b* provides a diagram for electronically transmitting certificates using an intermediate certificate authority module, in accordance with an embodiment of the invention; and FIG. 6 provides a process flow for securely electronically transmitting verification certificates, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In some embodiments, the entity may be a financial institution which may include any financial institutions such as commercial banks, thrifts, federal and state savings banks, savings and loan associations, credit unions, investment companies, insurance companies and the like. In some embodiments, the entity may be a non-financial institution. As described herein, a "user" may be an employee of the entity. As used here, the term "third party entity" may refer to any other entities, vendors, customers, or the like associated with the entity.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access, develop, manage, maintain, test, and/or use one or more applications provided by the entity and/or the system of the present invention. In some embodiments, the user may be an employee of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, entities that mutually transmit secure data must do so by transmitting specific certificates for verification that each entity is who they claim to be. One way that entities create such certificates is by way of an external certificate authority that assigns each entity at least one certificate. However, it may be difficult to authenticate whether the certificate assigned to each entity has been intercepted internally within a managing entity's internal transmission between points (e.g., such as between a host server and an AppProxy of the attached document), and the certificate may be compromised. In order to solve this problem, the present invention provides for implementing an internal entity ICA (intermediate certificate authority) mTLS (mutual transport layer security) conversation to allow an entity-specific certificate authority to generate its own certificate which is transmitted to the second point in the internal transmission (e.g., the AppProxy, or the like) for sending of the external certificate authority generated certificate to the external entity for mutual authentication. Further, in this way, the first point of internal transmission (e.g., the host server, or the like) does not have to store the certificate in its own HSM (hardware security module), and this can instead be handled by an intermediate certificate authority module which provides HSM as a service across an entity network topology. Typically, external certificates may expire every two years or so, depending on entity guidelines, and it is advantageous to minimize the number of external certificates that an entity needs to manage and provision with external vendor services. In terms of the present invention, each line of business or technology group within an entity might choose to only have a single external certificate to facilitate mutual transport layer security (mTLS) or one-way transport layer security (TLS). It is understood that with regard to mTLS, both client and vendor have to have a certificate that they share with each other. As such, the managing entity may require each internal service or application which connects securely with an external vendor service to undergo a public key infrastructure (PKI) governance and certificate authority every year, which can be costly, cumbersome, time intensive, and prone to human error. As such, a clear need exists for a way in which to enhance the efficiency of this process.

FIG. 1 provides a block diagram illustrating a system environment 100 for securely electronically transmitting verification certificates in high data transmission volume, in accordance with an embodiment of the invention. As illustrated in FIG. 1, the environment 100 includes a verification certificate transmission system 300, an entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200.

The entity system(s) 200 may be any system owned or otherwise controlled by an entity to support or perform one or more process steps described herein. In some embodiments, the entity may be a financial institution. In some embodiments, the entity may be a non-financial institution. In some embodiments, the entity may be any organization that uses encryption and decryption while communicating with other entities. In some embodiments, the one or more third party systems 201 may other entities, vendors, customers, or the like associated with the entity that engage in data transmission events with the entity.

The verification certificate transmission system 300 is a system of the present invention for performing one or more process steps described herein. In some embodiments, the verification certificate transmission system 300 may be an independent system. In some embodiments, the verification certificate transmission system 300 may be a part of the entity system 200.

The verification certificate transmission system 300, the entity system 200, the computing device system 400, and the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the verification certificate transmission system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the verification certificate transmission system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a verification certificate transmission application 250, one or more entity applications 270, and a data repository 280 comprising historical transaction data associated with one or more resource pools of users 110. The one or more entity applications 270 may be any applications developed, supported, maintained, utilized, and/or controlled by the entity that perform one or more organizational activities. In one embodiments, the entity application may be an online banking application. The computer-executable program code of the network server application 240, the verification certificate transmission application 250, the one or more entity application 270 to perform certain logic, data-extraction, and data-storing functions of the entity system 200 described herein, as well as communication functions of the entity system 200.

The network server application 240, the verification certificate transmission application 250, and the one or more entity applications 270 are configured to store data in the data repository 280 or to use the data stored in the data repository 280 when communicating through the network communication interface 210 with the verification certificate transmission system 300, and/or the computing device system 400 to perform one or more process steps described herein. In some embodiments, the entity system 200 may receive instructions from the verification certificate transmission system 300 via the verification certificate transmission application 250 to perform certain operations. The verification certificate transmission application 250 may be provided by the verification certificate transmission system 300.

FIG. 3 provides a block diagram illustrating the verification certificate transmission system 300 in greater detail, in accordance with embodiments of the invention. As illustrated in FIG. 3, in one embodiment of the invention, the verification certificate transmission system 300 includes one or more processing devices 320 operatively coupled to a network communication interface 310 and a memory device 330. In certain embodiments, the verification certificate transmission system 300 is operated by an entity, such as a financial institution. In some embodiments, the verification certificate transmission system 300 is owned or operated by the entity of the entity system 200. In some embodiments, the verification certificate transmission system 300 may be an independent system. In alternate embodiments, the verification certificate transmission system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the verification certificate transmission system 300 described herein. For example, in one embodiment of the verification certificate transmission system 300, the memory device 330 includes, but is not limited to, a network provisioning application 340, a pre-storage application 350, an updating application 360, a querying application 370, a transmission application 380, and a data repository 390 comprising any data processed or accessed by one or more applications in the memory device 330. The computer-executable program code of the network provisioning application 340, the pre-storage application 350, the updating application 360, the querying application 370, and the transmission application 380 may instruct the processing device 320 to perform certain logic, data-processing, and data-storing functions of the verification certificate transmission system 300 described herein, as well as communication functions of the verification certificate transmission system 300.

The network provisioning application 340, the pre-storage application 350, the updating application 360, the querying application 370, and the transmission application 380 are configured to invoke or use the data in the data repository 390 when communicating through the network communication interface 310 with the entity system 200, and/or the computing device system 400. In some embodiments, the network provisioning application 340, the pre-storage application 350, the updating application 360, the querying application 370, and the transmission application 380 may store the data extracted or received from the entity system 200, and the computing device system 400 in the data repository 390. In some embodiments, the network provisioning application 340, the pre-storage application 350, the updating application 360, the querying application 370, and the transmission application 380 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a verification transmission application 421, and an entity application 424. These applications also typically instructions to a graphical user interface (GUI) on the display 430 that allows the user 110 to interact with the entity system 200, the verification certificate transmission system 300, and/or other devices or systems. The memory 420 of the computing device system 400 may comprise a Short Message Service (SMS) application 423 configured to send, receive, and store data, information, communications, alerts, and the like via the wireless network 152. In some embodiments, the entity application 424 may be an online banking application. In some embodiments, the verification transmission application 421 provided by the verification certificate transmission system 300 allows the user 110 to access the verification certificate transmission system 300. In some embodiments, the entity application 424 provided by the entity system 200 and the verification transmission application 421 allow the user 110 to access the functionalities provided by the verification certificate transmission system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. **5*a* provides a diagram for electronically transmitting certificates, in accordance with an embodiment of the invention. FIG. 5*a* is provided for baseline discussion purposes to contextualize later discussion of the invention's verification certificate processes. As shown in FIG. 5, the entity system 200 may comprise a server 500 and a demilitarized zone (DMZ) 504. The server 500 typically contains a host server 502, which is an application that accepts server certificates and presents a deals client certificate in response. It is understood that the mTLS transmission terminates at the host server 502. As shown, a firewall 506 exists between the host server 502 and AppProxy 508, as well as between the AppProxy 508 and DMZ 504 and the network 150. Firewall 506 rules to allow host server 502 to communicate with AppProxy 508. The AppProxy 508 must be configured to pass host server 502 traffic through the secure DMZ 504 zone to URL (uniform resource locator) addresses over network 150 which allows the host server 502 to call a specific endpoint 510. It is understood that firewall 506 rules must be updated to allow AppProxy 508 traffic from the host server 502 out via network 150. The URL points to endpoint 510, which listens on mTLS and presents a server certificate while also requiring a client certificate. mTLS certificate keys must be stored in HSM (hardware security module) 512, which is configured to be compliant with the engineering and security protocols of the entity system 200**.

FIG. 5*b* provides a diagram for electronically transmitting certificates using an intermediate certificate authority module, in accordance with an embodiment of the invention. As shown on the left of FIG. 5*b*, entity system 200 may include one or more internal systems or applications 526 which require interfacing with one or more external vendor services 1-N of third party system(s) 201. As opposed to using the single external certificate process described in FIG. 5*a*, the process illustrated in FIG. 5*b* represents an intermediate certificate authority module 522, which is a module, engine, component, or the like, that acts to assign an external certificate from the external certificate repository 524 to each internal certificate from the internal certificate repository 520. As such, one or more internal certificates from internal certificate repository 520 may be aligned or matched with each external certificate from the external certificate repository 524. In this way, the overall system network resource load is reduced, and the complexity involved with establishing secure connections with external vendor services 1-N is reduced as well by economizing the use of external certificates such that every internal certificate no longer requires its own unique external certificate.

The invention facilitates connections using transport layer security (TLS) or mutual transport layer security (mTLS) wherein internal and external certificates must be provisioned prior to setting up connectivity/mapping. After each certificate is mapped and provisioned with necessary authentication credentials and network resource, these mappings, and their respective device permissions, are stored in their respective repository and the mapping is configured to allow future connectivity. As further shown in FIG. 5*b*, this allows a minimal number of external certificates to be managed with keys stored in hardware security module (HSM) 512, as opposed to requiring multiple costly HSMs to be deployed across the topology of the entity system 200. The HSM 512 may be located at or near the intermediate certificate authority module 522 and may be provided as a service to any or all internal systems/apps 526.

FIG. 6 provides a process flow for securely electronically transmitting certificates, in accordance with an embodiment of the invention. As shown in block 610, the process begins whereby the system receives a request to establish a secure connection between an internal server and an external third party entity server. As discussed in FIG. 5, typically this would entail an internal entity server, such as Deal Host 502, accepting an external certificate via AppProxy 508, and then issuing a client certificate in response. As shown in block 620, the process continues by initiating an intermediate certificate authority module, wherein the system may generate, via the intermediate certificate authority module, a unique verification certificate, as shown in block 630.

Next, as shown in block 640, the system may transmit the unique verification certificate to a second internal point, such as AppProxy 508, to be forwarded to the internal server. Simultaneously, the intermediate certificate authority module may transmit the unique verification certificate to the external third party entity server, as shown in block 650. In this way, the present invention provides for implementing an internal entity ICA (intermediate certificate authority) mTLS (mutual transport layer security) conversation to allow an entity-specific certificate authority to generate its own certificate which is transmitted to the second point in the internal transmission (e.g., the AppProxy 508, or the like) for sending of the external certificate authority generated certificate to the external third party entity server for mutual authentication. Further, in this way, the first point of internal transmission (e.g., the host server 502, or the like) does not have to store the certificate in its own HSM (hardware security module).

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for securely electronically transmitting verification certificates, the system comprising:

at least one network communication interface;

at least one non-transitory storage device; and at least one processing device coupled to the at least one non-transitory storage device and the at least one network communication interface, wherein the at least one processing device is configured to:

assign an external certificate of one or more external third party entity servers to an internal certificate of one or more internal entity servers allowing for management of external certificates with keys stored in a hardware security module;

receive a request to establish a secure connection between an internal entity server of the one or more internal entity servers and an external third party entity server of the one or more external third party entity servers, wherein the request comprises transmission of an external certificate of the external third party entity server;

initiate an intermediate certificate authority module to generate a unique verification certificate from a match of the external certificate to an external certificate assigned to the internal server;

map the unique verification certificate to a second internal point from the internal entity server and provision the unique verification certificate to permit connectivity between the second internal point and the third party entity server, wherein mapping the unique verification certificate to the second internal point further comprises authenticating device permissions associated with the internal entity server and the external third party entity server based on internal and external certificate provisioning for connectivity between the internal entity server and the external third party entity server;

transmit the unique verification certificate to the second internal point, wherein the second internal point is not the internal entity server and does not store the unique verification certificate in a hardware security module, wherein the second internal point comprises an application proxy; and simultaneously transmit the unique verification certificate to the external third party entity server for implementing the internal entity verification certificate mutual transport layer security and connect the external third party entity server to the second internal point.

2. The system of claim 1, wherein the application proxy communicates directly with the internal entity server.

3. The system of claim 1, wherein the unique verification certificate is transmitted over a mutual transport layer security protocol.

4. The system of claim 1, wherein the intermediate certificate authority module exists within a network boundary of a same entity as the internal entity server.

5. A computer program product for securely electronically transmitting verification certificates, the computer program product comprising a non-transitory computer-readable storage medium having computer executable instructions for causing a computer processor to perform the steps of:

assign an external certificate of one or more external third party entity servers to an internal certificate of one or more internal entity servers allowing for management of external certificates with keys stored in a hardware security module;

receive a request to establish a secure connection between an internal entity server of the one or more internal entity servers and an external third party entity server of the one or more external third party entity servers, wherein the request comprises transmission of an external certificate of the external third party entity server;

initiate an intermediate certificate authority module to generate a unique verification certificate from a match of the external certificate to an external certificate assigned to the internal server;

map the unique verification certificate to a second internal point from the internal entity server and provision the unique verification certificate to permit connectivity between the second internal point and the third party entity server, wherein mapping the unique verification certificate to the second internal point further comprises authenticating device permissions associated with the internal entity server and the external third party entity server based on internal and external certificate provisioning for connectivity between the internal entity server and the external third party entity server;

transmit the unique verification certificate to the second internal point, wherein the second internal point is not the internal entity server and does not store the unique verification certificate in a hardware security module, wherein the second internal point comprises an application proxy; and simultaneously transmit the unique verification certificate to the external third party entity server for implementing the internal entity verification certificate mutual transport layer security and connect the external third party entity server to the second internal point.

6. The computer program product of claim 5, wherein the application proxy communicates directly with the internal entity server.

7. The computer program product of claim 5, wherein the unique verification certificate is transmitted over a mutual transport layer security protocol.

8. The computer program product of claim 5, wherein the intermediate certificate authority module exists within a network boundary of a same entity as the internal entity server.

9. A computer implemented method for securely electronically transmitting verification certificates, wherein the method comprises:

assigning an external certificate of one or more external third party entity servers to an internal certificate of one or more internal entity servers allowing for management of external certificates with keys stored in a hardware security module;

receiving a request to establish a secure connection between an internal entity server of the one or more internal entity servers and an external third party entity server of the one or more external third party entity servers, wherein the request comprises transmission of an external certificate of the external third party entity server;

initiating an intermediate certificate authority module to generate a unique verification certificate from a match of the external certificate to an external certificate assigned to the internal server;

mapping the unique verification certificate to a second internal point from the internal entity server and provisioning the unique verification certificate to permit connectivity between the second internal point and the third party entity server, wherein mapping the unique verification certificate to the second internal point further comprises authenticating device permissions associated with the internal entity server and the external third party entity server based on internal and external certificate provisioning for connectivity between the internal entity server and the external third party entity server;

transmitting the unique verification certificate to the second internal point, wherein the second internal point is not the internal entity server and does not store the unique verification certificate in a hardware security module, wherein the second internal point comprises an application proxy; and simultaneously transmitting the unique verification certificate to the external third party entity server for implementing the internal entity verification certificate mutual transport layer security and connect the external third party entity server to the second internal point.

10. The computer implemented method of claim 9, wherein the application proxy communicates directly with the internal entity server.

11. The computer implemented method of claim 9, wherein the unique verification certificate is transmitted over a mutual transport layer security protocol.

* * * * *